J. R. HICKEY.
AUTOMOBILE FENDER.
APPLICATION FILED AUG. 6, 1909.

946,777.

Patented Jan. 18, 1910.
2 SHEETS—SHEET 1.

Witnesses

Inventor
J. R. Hickey,
By
Attorneys

J. R. HICKEY.
AUTOMOBILE FENDER.
APPLICATION FILED AUG. 6, 1909.
946,777.
Patented Jan. 18, 1910.
2 SHEETS—SHEET 2.
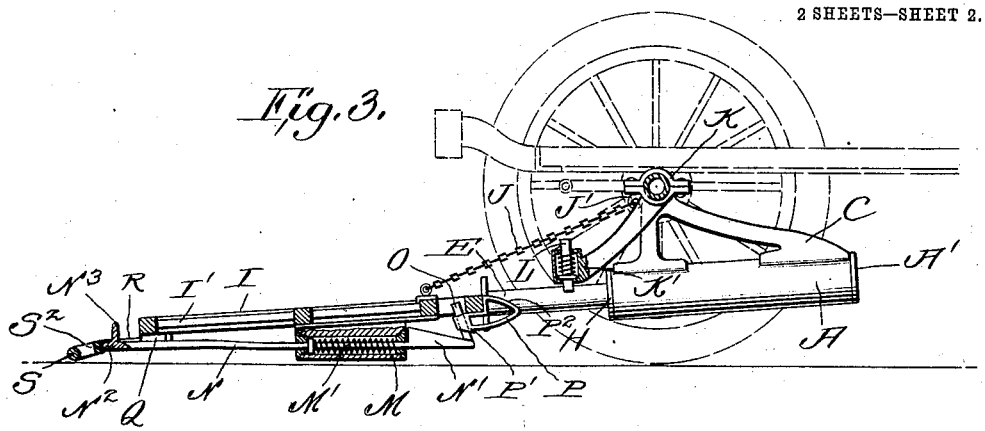
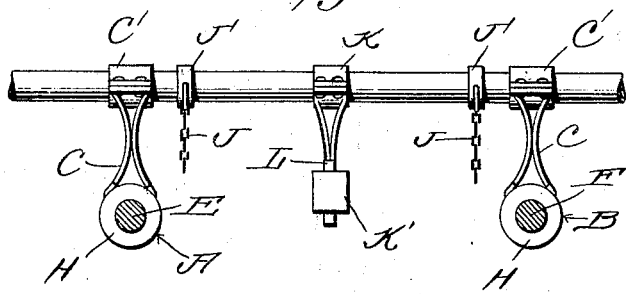
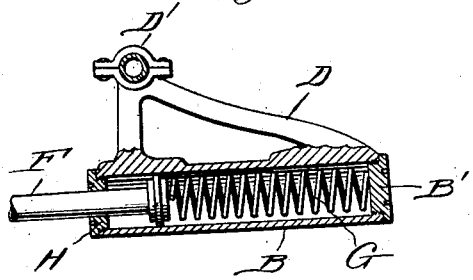
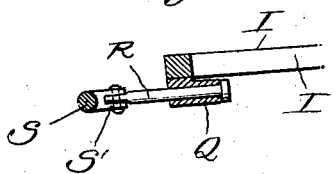
Witnesses
Inventor
J. R. Hickey

UNITED STATES PATENT OFFICE.

JOSEPH R. HICKEY, OF PROVIDENCE, RHODE ISLAND.

AUTOMOBILE-FENDER.

946,777.

Specification of Letters Patent. Patented Jan. 18, 1910.

Application filed August 6, 1909. Serial No. 511,559.

*To all whom it may concern:*

Be it known that I, JOSEPH R. HICKEY, a citizen of the United States, residing at Providence, in the county of Providence and State of Rhode Island, have invented a new and useful Improvement in Automobile-Fenders, of which the following is a specification.

This invention relates to automobile fenders, the object being to provide a fender which is so constructed that when the same is struck by an object, the same will be forced forwardly under the object so as to pick the same up.

A further object of the invention is to provide a fender which is forced forwardly by spring actuated plungers, said fender being held in withdrawn position by a locking pin which is released by a tripping member operated by the obstruction when brought into engagement with the same.

A still further object of my invention is to provide a fender which is so constructed that it can be easily and quickly attached to any of the well-known makes of automobiles now in use in such a manner that the same will not interfere with the front wheels in any way.

Another object of the invention is to provide the fender with a tripping pin adapted to release the locking pin, said tripping pin being operated by the head of an operating rod which is forced inwardly by an outwardly extending bar arranged in advance of the forward end of the fender so that when the same is struck by an object, it will be forced inwardly so as to release the locking pin in order that the springs can force the fender outwardly or forwardly.

A still further object of my invention is to provide a fender which is mounted at an incline so that as the same is moved forwardly, it will be brought closer to the ground in such a manner that the object struck will be picked up by the same.

Still another object of the invention is to provide means for supporting the fender when in an extended position so as to relieve the spring actuated rods of a part of the strain.

With these various objects in view, my invention consists in the novel features of construction, combination and arrangement of parts, all of which will be hereinafter fully described and pointed out in the claims.

Figure 1:
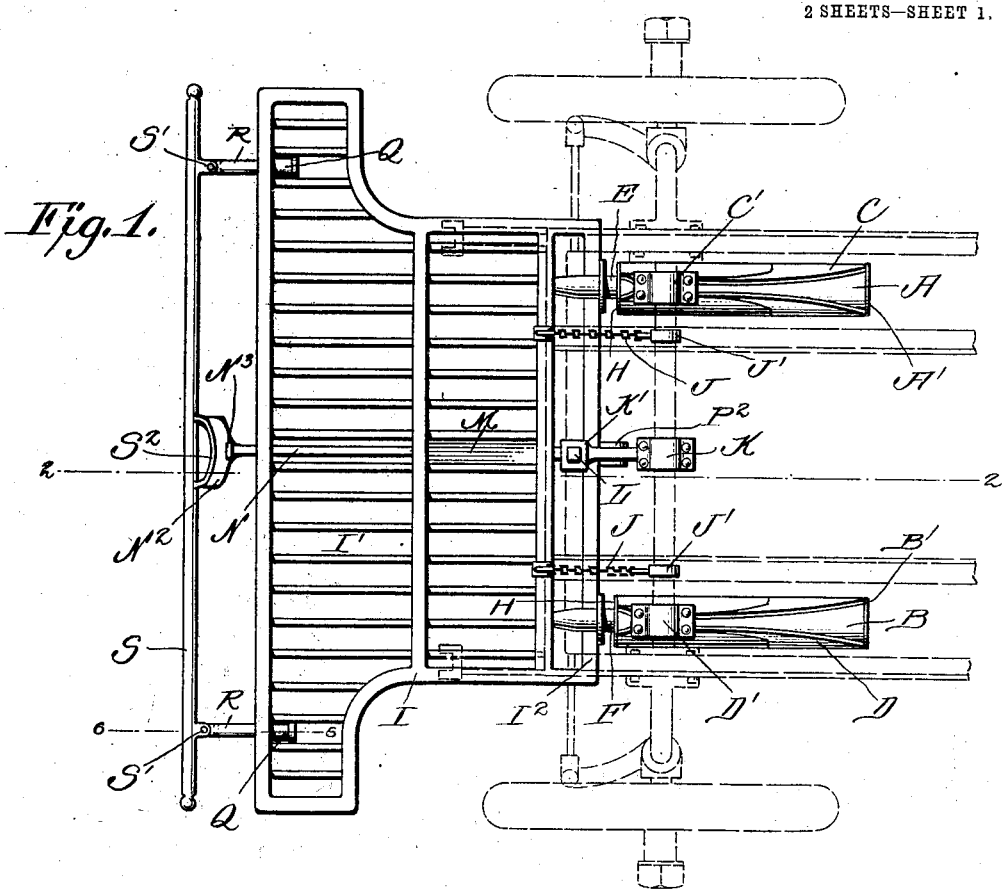
Figure 2:
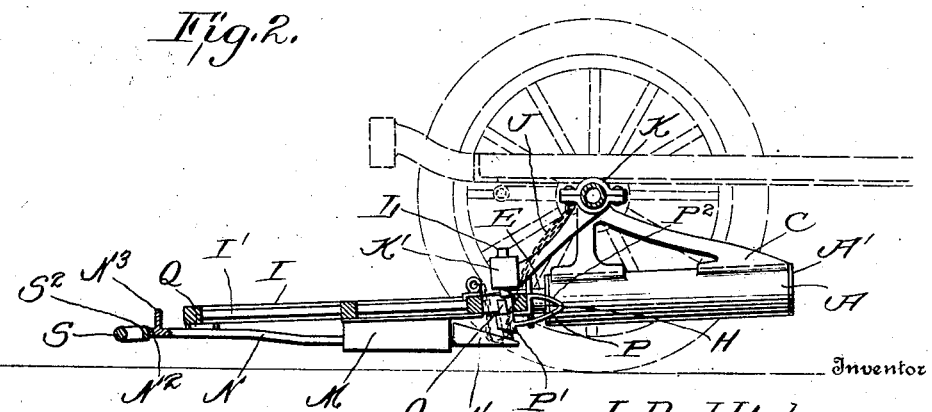

In the drawings forming a part of this specification: Figure 1 is a top plan view of my improved fender showing the application of the same. Fig. 2 is a section taken on the line 2—2 of Fig. 1. Fig. 3 is a longitudinal section through the fender showing the same in an extended position. Fig. 4 is a transverse section through the fender. Fig. 5 is a longitudinal section through one of the cylinders, and Fig. 6 is a detail section taken on the line 6—6 of Fig. 1.

In carrying out my improved invention, I employ a pair of cylinders A and B provided with hangers C and D adapted to be secured over the axle of an automobile, as clearly shown, by clamping members C', D', which enable the same to be easily and quickly attached or detached from the automobile.

The cylinders are provided with cap heads A', B' threaded into the rear ends of the cylinders and mounted within the cylinders are plunger rods E and F provided with heads, as clearly shown in Fig. 5, and arranged to the rear of the heads are coil springs G for normally forcing the heads forwardly. The rods extend out through the ring caps H which are also threaded into the forward ends of the cylinders and the above coil springs are of such a size and have such strength that they will force the plungers E and F outwardly until the heads are brought into engagement with the ring caps H.

Secured on the forward ends of the plunger rods E and F is a fender frame I which may be of any construction desired but is preferably of the shape shown, having an enlarged forward portion and a reduced rear portion so as to allow the wheels of the automobile to move freely without any danger of the same being brought into engagement with the fender. The fender is, in the form shown, provided with bars I' forming an openwork frame for supporting an object or a person when the same is thrown upon the fender, and for supporting the fender when in an extended position, as will be hereinafter fully described, I provide chains J which are connected to the fender, as clearly shown, and have their rear ends connected to eyes carried by rings J' secured on the axle of the automobile.

Secured centrally on the axle of the automobile is a bracket K which is provided with a box K' at its lower end in which is mounted a spring actuated locking pin L adapted to extend down along side of the rear bar I² of the frame and hold the fender in a contracted position as will be hereinafter fully described.

Secured to the under side of the fender is a housing M through which extends an operating bar N provided with a head N' having a beveled face adapted to engage the beveled lower end of a tripping pin O which is mounted within a guideway P' of a guide member P which extends rearwardly from the fender and then forwardly, having an inclined portion P² against which the locking pin L is adapted to be brought when the fender is forced rearwardly so as to allow the pin to ride over the rear bar of the fender frame and in this position the locking pin is over the tripping pin O so that when the operating bar N is forced rearwardly the head N' will cause the tripping pin to move upwardly which will force the locking pin upwardly so as to release the fender and allow the plunger rods to force the fender forwardly. The operating bar N is surrounded by a coil spring M' within the casing M for holding the bar N extended out beyond the fender.

Secured to the under side of the fender frame adjacent its ends are guide sleeves Q in which are slidably mounted supporting rods R which are pivotally connected to an obstruction bar S, as clearly shown at S', said obstruction bar being provided with a curved central member S² adapted to fit within the curved member N² of the operating bar N which is provided with an upwardly projecting lug N³ for limiting the inward movement of the same which is adapted to engage the front bar of the fender when the obstruction bar is forced inwardly by coming into contact with an object.

It will be noticed that the cylinders carrying the plungers are arranged at an inclination or, in other words, out of a horizontal plane, so that when the fender is extended the same will be brought closer to the ground than when in a contracted position, which will pick up the object struck so that all danger of the object getting under the fender is prevented.

The operation of my improved fender is as follows: Supposing that the fender is in the position shown in Figs. 1 and 2 and the obstruction bar is brought into engagement with an object of any kind, the same will be forced rearwardly which will force the operating bar rearwardly so as to cause the beveled head to raise the tripping pin which will lift the locking pin from in front of the bar of the frame so as to release the same and the springs within the cylinders will force the plunger rods forwardly which will force the fender outwardly under the object struck and it will be seen that as the fender is moved forwardly, it is brought closer to the ground.

Having thus fully described my invention, what I claim as new and desire to secure by Letters Patent, is:

1. An automobile fender comprising a spring actuated fender proper, a spring actuated pin for engaging and locking said fender against the tension of said first mentioned spring and means for disengaging said pin from said fender, said means being operated by an obstruction bar arranged in advance of the fender.

2. A fender for automobiles comprising a pair of spring actuated plunger rods adapted to be carried by the axle of an automobile, of a fender carried by said plunger rods, a spring actuated pin for engaging and locking said fender in a contracted position and a tripping pin for engaging and releasing said locking pin, said tripping pin being operated by an obstruction bar arranged in advance of the fender.

3. A fender for automobiles comprising a slidably mounted fender proper, means for forcing said fender forwardly, a movable pin for engaging and locking said fender in a contracted position and a tripping pin operated by an obstruction bar for releasing said locking pin.

4. The combination with an automobile, of a fender slidably mounted under said automobile in an inclined position, a spring actuated locking pin for engaging said fender, means for forcing said fender forwardly and means operated by an obstruction bar for moving said locking pin out of engagement with the fender.

5. The combination with a vehicle, of a pair of cylinders adapted to be connected to the front axle of the vehicle, spring actuated plunger rods mounted in said cylinders, a fender carried by said plunger rods, a bracket carried by said axle, a locking pin slidably carried by the said bracket, a tripping pin slidably mounted in the fender, and an obstruction bar arranged in advance of said fender together with means operated by said obstruction bar for throwing said tripping pin into engagement with the locking pin.

6. In a fender of the kind described, the combination with a pair of cylinders provided with brackets for securing the same to an axle of a vehicle, of spring actuated plunger rods mounted within said cylinders, a fender carried by said plunger rods, a spring actuated locking pin carried by a bracket adapted to be secured to the axle, said pin being adapted to engage the rear bar of a fender when in a contracted position, a slidably mounted tripping pin carried by the fender adapted to engage said locking pin, an operating rod provided with a beveled head for engaging said tripping pin, and an obstruction bar arranged in advance of said fender for operating said operating rod.

7. In a fender of the kind described, the combination with a vehicle, of brackets adapted to be secured to the front axle of the vehicle carrying cylinders arranged at an inclination, plunger rods arranged in said cylinders, springs arranged in said cylinders to the rear of said plunger rods, a fender frame carried by the forward ends of said plunger rods, chains connecting said fender to said axle, a bracket secured to said axle provided with a box, a spring actuated pin mounted in said box for engagement with the rear bar of said fender frame, a guide member carried by said fender frame guiding said locking pin, a tripping pin slidably carried by said guiding member, a casing carried by said fender, a spring actuated operating rod mounted within said casing provided with a beveled head for engaging said tripping pin, and an obstruction bar slidably mounted in advance of said fender for operating said operating rod.

8. In a fender of the kind described, the combination with a pair of spring actuated plungers, of a fender frame carried by said plungers, means for limiting the forward movement of said fender frame, a locking pin for engaging said frame, a tripping pin for engaging said locking pin, and means operated by an obstruction bar for throwing said tripping pin into engagement with the locking pin.

9. A fender for automobiles comprising a pair of cylinders adapted to be supported below the axle of the automobile by brackets in an inclined position, plunger rods mounted in said cylinders, springs arranged in the cylinders to the rear of said plunger rods, a fender frame carried by said plunger rods, a bracket secured to the axle of said frame provided with a boxing, a spring actuated locking pin mounted in said boxing adapted to engage the bar of said frame, means for guiding said locking pin over the bar of said frame, and means for raising said pin above said bar, said means being operated by an obstruction bar arranged in advance of the fender frame.

10. A fender for automobiles comprising a pair of cylinders adapted to be connected to the axle of the automobile, plunger rods provided with heads mounted in said cylinders, springs arranged in said cylinders bearing against said heads, a fender frame carried by said plunger rods, chains for supporting said fender frame, means for locking said fender frame in a contracted position against the tension of said springs, and means for tripping said locking means, said means being operated by an obstruction bar mounted in advance of said fender frame.

11. The combination with a vehicle, of a pair of cylinders adapted to be supported under the axle of said vehicle, in an inclined position, spring actuated plunger rods mounted in said cylinders, a fender carried by said plunger rods, a guide member carried by said fender, a bracket carrying a spring actuated locking pin adapted to engage said guide member for carrying said pin over the rear bar of said frame, a tripping pin carried by said guide member adapted to aline with said locking pin, said tripping pin being provided with a beveled lower end, a casing secured to the under side of the fender, a spring actuated operating rod mounted in said casing provided with a beveled head for engaging the beveled end of said tripping pin, a stop for limiting the movement of said operating rod, and an obstruction rod slidably mounted at the forward end of said fender adapted to engage said operating rod.

12. In a fender of the kind described the combination with a pair of spring actuated plunger rods, of a fender carried by said rods, a spring actuated member for engaging and locking said fender in a contracted position against the tension of said first mentioned spring, guide sleeves carried by said fender, supporting rods slidably mounted in said sleeves, an obstruction bar connected to said supporting rods and means operated by the obstruction rod for moving said member out of engagement with said fender.

13. A fender for motor vehicles comprising a spring actuated slidably mounted fender proper, a movable locking pin for engaging said fender and holding the same against the tension of said spring, a slidably mounted obstruction bar carried by said fender and means operated by said obstruction bar for moving said pin out of engagement with said fender.

JOSEPH R. HICKEY.

Witnesses:
CHARLES J. CHRISTIE,
J. ALF. J. PLONTS,
JAMES J. McGOVERN.